A. McDANNOLD.
AUTOMATIC CLUTCH CONTROL.
APPLICATION FILED MAR. 11, 1920.
1,371,918.
Patented Mar. 15, 1921.
2 SHEETS—SHEET 1.
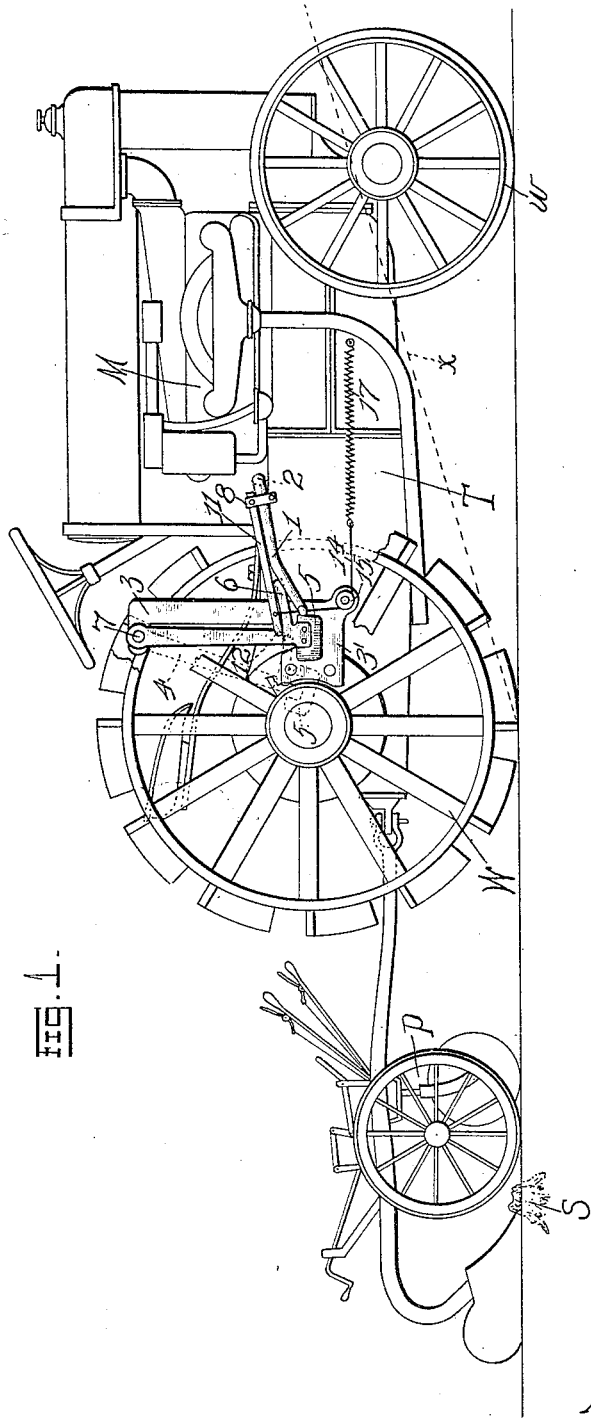
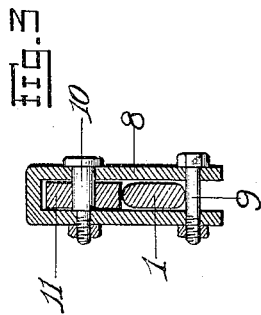
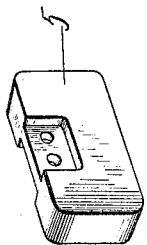
Inventor
Alexander McDannold
by Emil Starek Atty.

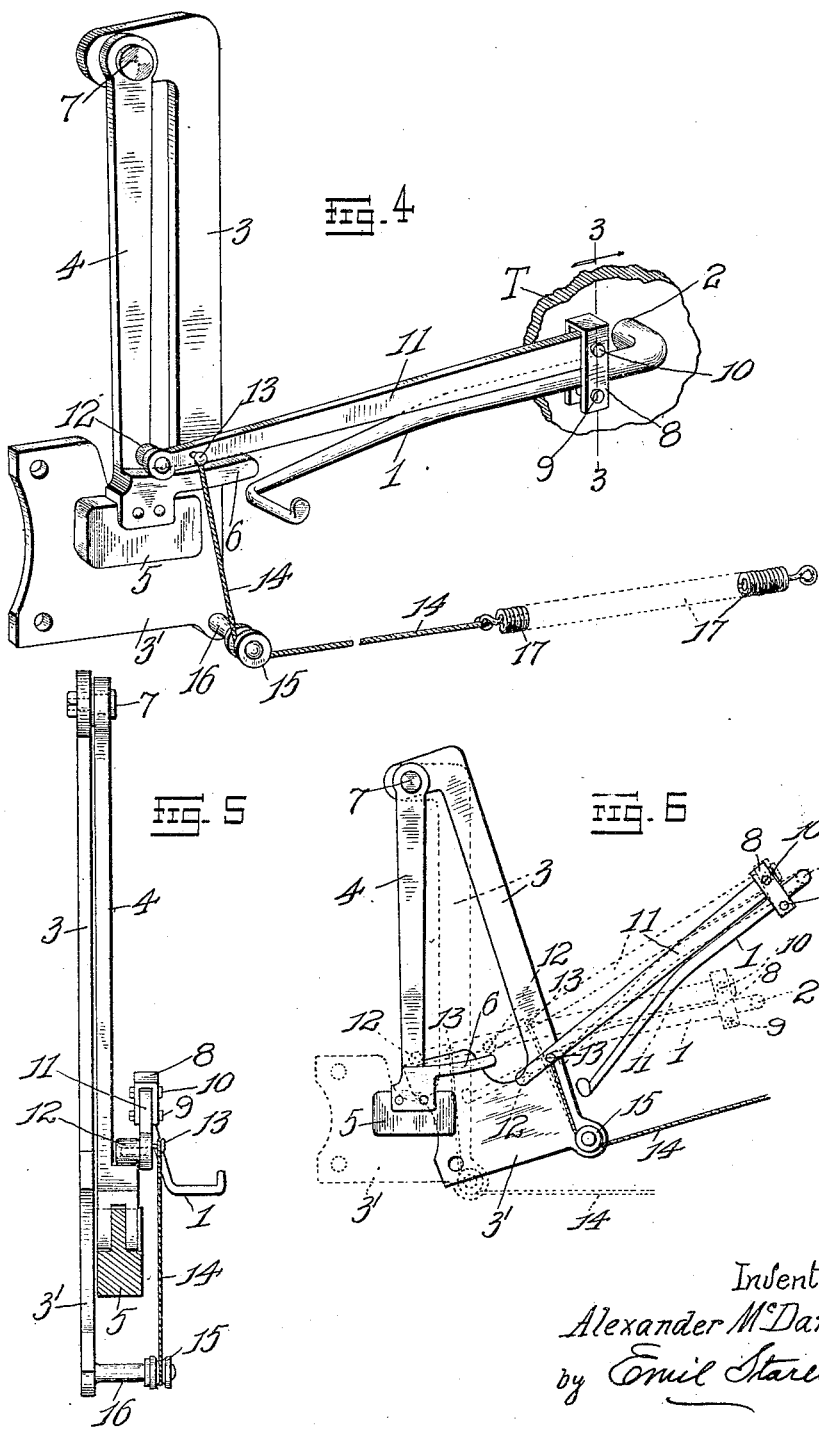

UNITED STATES PATENT OFFICE.

ALEXANDER McDANNOLD, OF HALLANDALE, FLORIDA.

AUTOMATIC CLUTCH CONTROL.

1,371,918.  Specification of Letters Patent.  Patented Mar. 15, 1921.

Application filed March 11, 1920. Serial No. 365,061.

*To all whom it may concern:*

Be it known that I, ALEXANDER McDAN-NOLD, a citizen of the United States, residing at Hallandale, in the county of Broward and State of Florida, have invented certain new and useful Improvements in Automatic Clutch Controls, of which the following is a full, clear, and exact description, reference being had to the accompanying drawings, forming a part hereof.

The present invention is directed to improvements in automatic clutch controls for tractors, the object of the invention being to disconnect the running gear of the tractor from the engine under conditions when for any reason there is danger of the tractor rearing and turning over about the rotation axis of the rear wheels. It is well known that where a plow is attached to a tractor and the plow-share encounters a stump or other obstruction which suddenly arrests the forward travel of the tractor, the continued operation of the running gear will cause the body of the tractor to "wind" or rear about the axis of the rear wheels, rotation of the latter being arrested under the circumstances by the stoppage of the vehicle. In this rearing movement of the vehicle the driver often loses his head so that he fails to operate the clutch pedal to release the running gear from the engine at the critical moment and before the vehicle overturns. The result is that the driver is either killed or injured by the machine falling on top of him. To avoid such consequences is the purpose of the present improvement, the clutch pedal being automatically operated or depressed as the tractor approaches the critical angle at or beyond which there would be likelihood of the tractor overturning. The advantages of the invention will be fully apparent from the following detailed description in connection with the accompanying drawings in which—

Figure 1 represents a side elevation of a tractor showing my invention applied thereto; Fig. 2 is a perspective view of the weight attached to the pendant carrying the arcuate segment which supports the roller of the clutch control bar; Fig. 3 is a vertical sectional detail on the line 3—3 of Fig. 4; Fig. 4 is a perspective of the improved clutch-control; Fig. 5 is a front edge view thereof; and Fig. 6 is a perspective showing the relative position assumed by the various members with a rearing movement of the front end of the tractor.

Referring to the drawings, T, represents a conventional tractor and P, a plow attached to the rear end thereof as well understood in the art. It frequently happens that in plowing, the shares of the plow encounter an obstruction such as a stump S, bringing the machine suddenly to a stop; and since under the circumstances the rear wheels W of the tractor can not turn, the entire machine starts to revolve about the axis of said wheels, the front end of the machine rearing upward and the front wheels $w$ lifting off the ground, the machine assuming an inclination such as indicated by the dotted line $x$ in Fig. 1. If the running gear is not stopped at the critical moment the machine continues rearing until finally it overturns backward, crushing or maiming the driver, unless the driver has presence of mind to depress the clutch pedal or lever 1 which is not always the case. As well understood in the art the clutch pedal lever 1 actuates the clutch rod 2 which in turn disengages the clutch from the driving gear of the engine or motor M, the clutch mechanism not being shown because old and well understood by those skilled in the art, it being sufficient for our purpose to know that a depression of the lever 1 disengages the running gear from the engine. As indicated above, the object of my improvement is to effect an automatic depression of the clutch pedal 1 in the event the driver fails to do so at the critical moment of the rearing movement of the machine. In the present embodiment of my improvement I secure to the body of the tractor on one side thereof between the rear wheels W, a suitable bracket or standard 3, from the upper end of which I pivotally suspend a pendant or arm 4 carrying at the free end a suitable weight 5, the pendant being provided immediately above the weight with an arcuate segment 6 the upper edge of which has a curvature described by a radius from the pivot pin 7 as a center, said segment pointing forwardly, and the pendant being free to swing in a vertical plane longitudinally of the machine. Spanning the pedal lever 1 near the fulcrum axis thereof is a U-shaped strap 8, the free ends of whose arms are connected by a bolt 9 below the lever, there being hinged to the strap above the pedal lever about a pin 10, a clutch-control bar 11 extending rearward and at its free end carrying an anti-friction roller 12 normally resting on and supported by the segment 6. The outer face of the bar is provided with a pin 13 to which is secured the upper end of a cord or cable 14 passing over an idler pulley 15 mounted on a spindle 16 leading from the base 3' of the standard 3, the end of the cord beyond the idler being coupled to the adjacent terminal of a coiled tension spring 17, the opposite end of the spring being secured to the body of the tractor. The spring 17 obviously exerts a continuous pull on the cord 14 and consequently on the bar 11; and should the roller end of the bar be for a moment left unsupported by the segment 6, the spring would pull down the bar 11, said bar in turn depressing the pedal lever 1 with which it is in constant engagement.

The operation is clear from Fig. 6, and is substantially as follows: In the event the front end of the machine rears as previously pointed out, the inclined position assumed by the machine will tilt the standard 3 to the rearwardly inclined position shown in said figure, causing in effect, the pendant 4 to swing away from the bracket (through of course the pendant remains vertically suspended at all times) and thus withdrawing the segment 6 from under the roller 12 secured to the bar 11. This leaves the bar unsupported, whereupon the spring 17 by its tension pulls the bar down and the latter in turn pushes down the clutch lever 1, in precisely the same way as it would be pushed down by the foot of the driver, did not the driver lose his head at the critical moment. Thus the clutch pedal 1 becomes automatically depressed by my invention and is a means of preventing serious consequences should the forward travel of the tractor for any reason be arrested. With the unclutching of the running gear from the engine, the rearing action of the machine is arrested, and the machine settles down to its normal position of rest on all four wheels. To restore the roller 12 to its proper support on the segment 6, the driver simply picks up the bar 11 then swings the pendant 4 outward to bring the free end of the segment under the roller, and by allowing the pendant to swing back to normal the roller will ride over the segment whereupon the bar 11 will be properly supported. When the pedal 1 is depressed by foot there will be a slight depression of the strap 8 and consequently of the pivoted end of the bar 11 but this depression is quite negligible. The bar 11 of course oscillates in a vertical plane parallel to the plane of oscillation of the pendant 4. In Fig. 1 the dotted position of the pendant is merely relative, not actual, because in practice the swing of the pendant is merely relative, the same remaining suspended in a vertical position; it is the bracket 3 that oscillates with the rearing of the front end of the machine. The dotted positions of the parts in Fig. 1 however are correct in bringing out their proper relation when the machine does rear, the free end of the segment 6 being shown withdrawn from under the roller end of the bar 11. I may of course resort to various changes in the details without in any wise affecting the nature or spirit of the invention.

Having described my invention what I claim is:

1. In combination with a tractor provided with a depressible clutch operating member, a bar hinged at one end and engaging said member, a pendant loosely pivoted at a point beyond the free end of said bar, an arcuate segement at the free end of said pendant, the latter being free to oscillate longitudinally of the tractor, a member on the hinged bar normally resting on the segement, and means for depressing the bar and thereby actuating the clutch-operating member upon release of the bar by the segment with a sufficient relative swing of the pendant to release the member carried by the bar and resting on the segment, when the tractor rears to an angle to effect the swing of the pendant aforesaid.

2. In combination with a tractor provided with a depressible clutch pedal lever, a bar hinged at one end to oscillate in a vertical plane longitudinally of the tractor, said bar engaging the upper face of the pedal lever, a suitable standard fixed to the tractor at a point beyond the free end of the bar aforesaid, a roller on the bar near the free end thereof, a pendant hinged to the standard and free to swing parallel to the plane of oscillation of the hinged bar, an arcuate segment curved to conform to the arc of the radius of oscillation of the pendant carried at the free end of said pendant, said segment supporting the roller carried by the hinged bar, a tension spring secured at one end to the body of the tractor, a cord or wire leading from the opposite end of the spring and connected to the hinged bar, the spring drawing on the cord and pulling down the hinged bar upon release thereof by the segment with a relative swinging of the pendant through a sufficient arc to cause the roller to pass off the segment, the pedal clutch lever being depressed by the downward oscillation of the hinged bar aforesaid.

3. In a tractor of the character described and having a pedal lever, a depressible member in engagement with the pedal, gravity-actuated means for releasing said member with a rearing of the machine, and means exerting a pull on said member for depressing the same when released and simultaneously depressing the pedal lever.

In testimony whereof I affix my signature in presence of two witnesses.

ALEXANDER McDANNOLD.

Witnesses:
  M. ROMFH,
  H. H. CULBERTSON.